(12) United States Patent
Forcash et al.

(10) Patent No.: US 10,519,631 B2
(45) Date of Patent: Dec. 31, 2019

(54) WORK TOOL VISION SYSTEM

(71) Applicant: Caterpillar Inc., Peoria, IL (US)

(72) Inventors: Joe E. Forcash, Zelienople, PA (US); Michael Hoffelder, Norwich, NY (US); Robert C. McCall, Pittsburgh, PA (US); Lawrence A. Mianzo, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 15/712,352

(22) Filed: Sep. 22, 2017

(65) Prior Publication Data

US 2019/0093320 A1    Mar. 28, 2019

(51) Int. Cl.
*E02F 9/26* (2006.01)
*G05D 1/02* (2006.01)
*G06K 9/00* (2006.01)

(52) U.S. Cl.
CPC .............. *E02F 9/264* (2013.01); *E02F 9/261* (2013.01); *G05D 1/0246* (2013.01); *G06K 9/00791* (2013.01); *B60R 2300/602* (2013.01); *B60W 2300/17* (2013.01)

(58) Field of Classification Search
CPC .............. G06K 9/3216; G06K 9/6202; G06K 9/00791; E02F 9/261; E02F 9/264; G05D 1/0246; B60R 2300/602; B60W 2300/17
See application file for complete search history.

(56) References Cited

U.S. PATENT DOCUMENTS

| 4,785,512 A | * | 11/1988 | Sigel | F16L 55/18 166/55.2 |
| 6,525,746 B1 | * | 2/2003 | Lau | G06F 3/0481 715/725 |
| 6,681,043 B1 | * | 1/2004 | Lau | G06F 3/0481 382/173 |
| 7,320,385 B2 | | 1/2008 | Katae et al. | |
| 7,605,692 B2 | | 10/2009 | Yamada et al. | |
| 7,905,682 B2 | * | 3/2011 | Holl | E01C 23/088 299/1.05 |
| 8,146,813 B2 | | 4/2012 | King et al. | |
| 8,412,418 B2 | | 4/2013 | Kumagai et al. | |
| 2003/0052906 A1 | * | 3/2003 | Lau | G06F 3/0481 715/700 |
| 2006/0098729 A1 | * | 5/2006 | Shen | G08B 13/19608 375/240.01 |
| 2007/0263113 A1 | * | 11/2007 | Baek | G02B 26/0825 348/340 |
| 2010/0245532 A1 | * | 9/2010 | Kurtz | G06K 9/00711 348/14.03 |
| 2011/0169949 A1 | | 7/2011 | McCain et al. | |

(Continued)

FOREIGN PATENT DOCUMENTS

KR    20100002896 A    1/2010

*Primary Examiner* — Mussa A Shaawat
(74) *Attorney, Agent, or Firm* — Law Office of Kurt J. Fugman LLC (57) ABSTRACT

A method for monitoring the movement of a work tool of a machine using a work tool vision a comprises sensing data related to the image of a work tool, selecting a template of an image of a work tool, and displaying the sensed image of the work tool after modifying the sensed image of the work tool by at least zooming on a portion of the sensed data of the image if the sensed data of the image of a work tool matches the template of an image of a work tool.

20 Claims, 10 Drawing Sheets

(56) References Cited

U.S. PATENT DOCUMENTS

| | | | |
|---|---|---|---|
| 2012/0146789 A1* | 6/2012 | De Luca | G08B 21/12 |
| | | | 340/540 |
| 2014/0282013 A1* | 9/2014 | Amijee | G06F 16/4393 |
| | | | 715/732 |
| 2016/0138247 A1 | 5/2016 | Conway et al. | |
| 2018/0150058 A1* | 5/2018 | Shapiro | G05B 19/4093 |
| 2018/0196438 A1* | 7/2018 | Newlin | G05D 1/0214 |
| 2019/0048559 A1* | 2/2019 | Olsen | E02F 9/264 |
| 2019/0049988 A1* | 2/2019 | Meij | G06Q 50/28 |

* cited by examiner

WORK TOOL VISION SYSTEM

TECHNICAL FIELD

The present disclosure relates to machines such as earth moving, mining, construction machines and the like that use work tools to move objects or manipulate material. More specifically, the present disclosure relates to such machines that use a work tool vision system that allows the operator of a such a machine to see the work tool unobstructed and in the center of a frame of a camera or other sensor as the work tool moves.

BACKGROUND

Machines are routinely used in the earthmoving, construction, mining and other similar industries. These machines are used for various purposes and therefore employ a host of different work tools. For example, a wheel loader may use a bucket for moving earth, and may use a fork for picking up pallets. In some cases, the work tool may be located in a position during use where the view of the work tool from the vantage point of an operator in the cab is obstructed. This may make using the work tool effectively difficult.

To alleviate this problem, sensors such as cameras and the like may be employed that provide a view of the work tool from a different vantage point that is not obstructed. The camera may send a picture to the cab of the machine that may be watched by the operator as the work tool is moved. This may help the operator use the work tool in a more effective manner.

However, such cameras or other sensors are typically fixed in position relative to the work tool. As the work tool moves, the view of the work tool taken by the camera necessarily changes. This may lead to the work tool reaching an edge of the view of the camera. At this point, it may be desirable to zoom up on the work tool but this may not completely solve the problem as the zooming the view usually means that the center of the view becomes larger and if the work tool is not near the center of the view, the work tool will gradually fall out of the view, making the camera or other sensor unable to help the operator monitor the movement of the work tool.

Accordingly, it is desirable to develop a work tool vision system that compensates for the movement of a work tool in such a manner that the operator may still satisfactorily see or otherwise monitor the movement of the work tool.

SUMMARY OF THE DISCLOSURE

A method for monitoring the movement of a work tool of a machine using a work tool vision according to an embodiment of the present disclosure comprises sensing data related to the image of a work tool, selecting a template of an image of a work tool, and displaying the sensed image of the work tool after modifying the sensed image of the work tool by at least zooming on a portion of the sensed data of the image if the sensed data of the image of a work tool matches the template of an image of a work tool.

A work tool vision system for monitoring the movement of a work tool according to an embodiment of the present disclosure comprises a sensor, and an electronic controller unit coupled to the sensor, wherein the electronic controller unit is configured to: sense the position of the work tool at a first time interval, sense the position of the work tool at a second time interval, and zoom and center on a portion of the sensed data of the work tool taken at the second time interval if the position of the work tool relative to the sensor has changed from the first time interval to the second time interval.

An electronic controller unit of a machine according to an embodiment of the present disclosure comprises a memory including computer executable instructions for recognizing a work tool, and a processor coupled to the memory and configured to execute the computer executable instructions, the computer executable instructions when executed by the processor cause the processor to: sense data regarding a work tool attached to the machine, compare the sensed data to a data template of the work tool, and modify the sensed data if at least a portion of the sensed data matches the data template of the work tool by at least zooming on a portion of the sensed data.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

In various embodiments, a method for providing a work tool vision system, the work tool vision system itself, and an electronic controller unit that is configured to implement the method or be used with the work tool vision system may be provided and will now be described.

Figure 1:
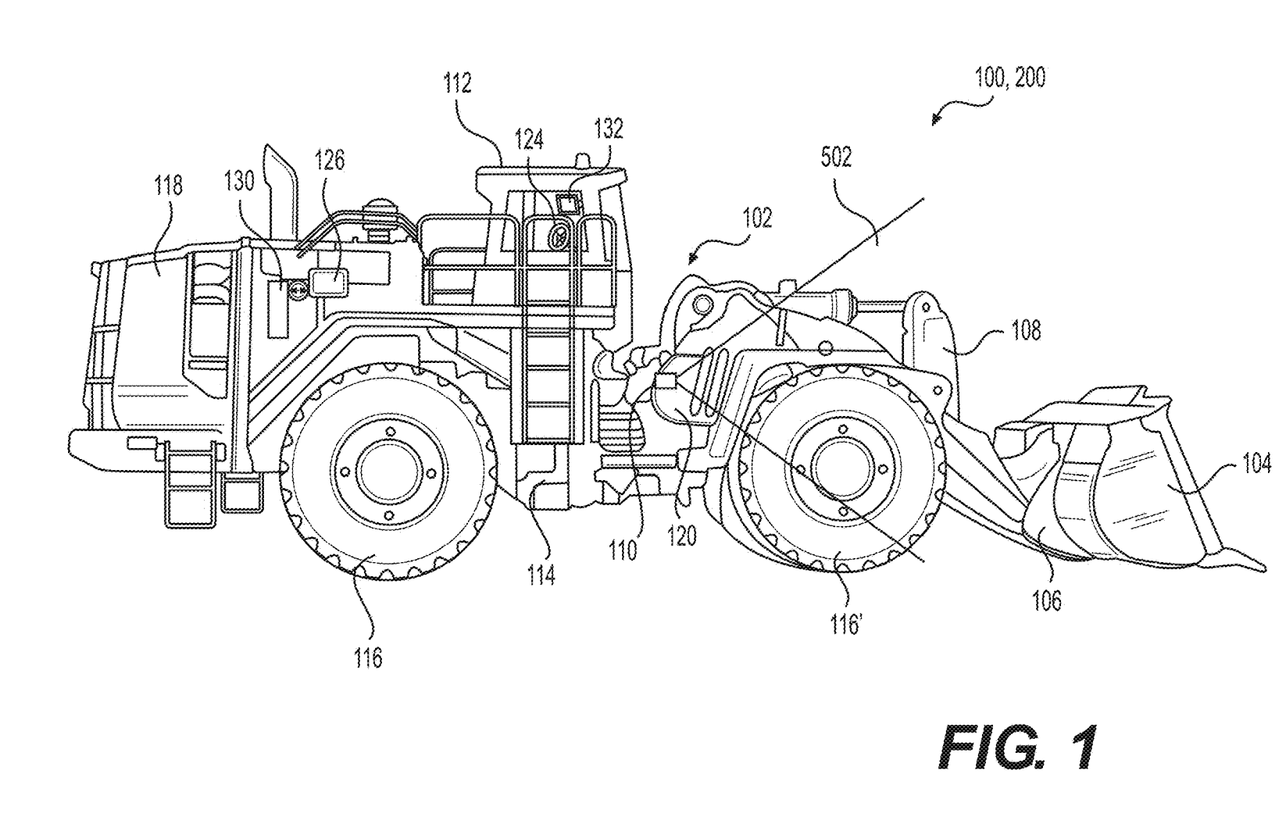
FIG. 1 is a perspective view of a machine utilizing a work tool vision system with a camera having a wide field of view camera according to an embodiment of the present disclosure.

FIG. 1 illustrates a work tool vision system 200 using on an apparatus 100, in accordance with an embodiment of the present disclosure. The apparatus 100 includes a machine 102 and a work tool 104 in an exemplary work environment. It will be appreciated that the work tool vision system 200 may include a plurality of machines and a plurality of work tools and the machine 102 and the work tool 104 illustrated in FIG. 1 are by way of example only and not by way of limitation. Further, the work tool vision system 200 may include additional components, including but not limited to, a base station in communication with the machine 102, a satellite system in communication with the machine 102, an unmanned aerial vehicle in communication with the machine 102, and the like, to assist recognition and monitoring of the movement of the work tool 104 relative to the machine 102.

The machine 102 may be a movable machine or a stationary machine having movable parts. In this respect, the term "movable" may refer to a motion of the machine 102, or a part thereof, along linear Cartesian axes, and/or along angular, cylindrical, or helical coordinates, and/or combinations thereof. Such motion of the machine 102 may be continuous or discrete in time. For example, the machine 102, and/or a part of the machine 102, may undergo a linear motion, an angular motion or both. Such linear and angular motion may include acceleration, rotation about an axis, or both. By way of example only and not by way of limitation, the machine 102 may be an excavator, a paver, a dozer, a skid steer loader (SSL), a multi-terrain loader (MTL), a compact track loader (CTL), a compact wheel loader (CWL), a harvester, a mower, a driller, a hammer-head, a ship, a boat, a locomotive, an automobile, a tractor, or other machine to which the work tool 104 is attachable.

In the example shown in FIG. 1, the machine 102 is a large wheel loader and includes a machine component 108, a sensor 110, an operator cab 112, a chassis 114, tires 116, and a hood 118. The machine component 108 is attachable to the work tool 104 at an attachment coupler 106 of the work tool 104. The operator cab 112 includes, among other components, a steering system 124 to guide the machine 102 in various spatial directions, and an output device 140. The operator cab 112 may be suitably sized to accommodate a human operator. Alternatively, the machine 102 may be controlled remotely from a base station, in which case, the operator cab 112 may be smaller. The steering system 124 may be a steering wheel or a joystick, or other control mechanism to guide a motion of the machine 102, or parts thereof. Further, the operator cab 112 may include levers, knobs, dials, displays, alarms, etc. to facilitate operation of the machine 102.

Under the hood 118, the machine 102 includes an electronic controller unit 126, and a machine control system 130. The machine 102 may include other components (e.g., as part of the chassis 114) such as transmission systems, engine(s), motors, power system(s), hydraulic system(s), suspension systems, cooling systems, fuel systems, exhaust systems, ground engaging tools, anchor systems, propelling systems, communication systems including antennas, Global Positioning Systems (GPS), and the like (not shown) that are coupled to the machine control system 130.

By way of example only and not by way of limitation, the machine component 108 may be an excavator arm including hydraulic cylinders and mechanical linkages, although other types of mechanical parts may be utilized to attach the work tool 104 to the machine 102. The mechanical linkages may include attachment components compatible to mate with the attachment coupler 106. The machine component 108 may be extendable, expandable, contractible, rotatable, translatable radially or axially, or otherwise movable by the machine 102 to couple to the work tool 104. For example, a height and a tilt of the machine component 108 may be variable to facilitate attachment at the attachment coupler 106. Once attached to the work tool 104, the machine component 108 may be configured to receive requisite power from the machine 102 to perform various operations (e.g., digging earth) in the exemplary worksite using the work tool 104.

In one embodiment of this disclosure, the sensor 110 may be a camera positioned on, inside, or above the operator cab 112 (not shown in FIG. 1). Alternatively, the sensor 110 may be a camera positioned on the machine component 108, e.g., at a knucle 120 near the rear end of the machine component 108 as shown in FIG. 1 (also positioned near the midplane of the machine along a direction perpendicular to the view of FIG. 1), although the sensor 110 may be positioned at other locations on the machine 102. By way of example only and not by way of limitation, the sensor 110 may be a monocular camera, a stereo camera, an infrared camera, an array of one or more types of cameras, an opto-acoustic sensor, a radar, a laser based imaging sensor, or the like, or combinations thereof, configured to assist recognition, detection, tracking, and installation of the work tool 104. For the embodiment shown in FIG. 1, a camera with a wide field of view 502 is employed and sends a signal so that an image is displayed on output device 132.

The work tool 104 is attachable to the machine 102, for example, to a linkage at an end portion of the machine component 108 via the attachment coupler 106. By way of example only and not by limitation, the work tool 104 may be a bucket for moving earth (as shown in FIG. 1), a fork for lifting pallets (as shown in FIGS. 2 thru 5), a harvester attachment, a drill head, a hammer head, a compactor head, or any other type of implement attachable to the machine 102. In this respect, the machine 102 may be configured to be attachable not just to one type of the work tool 104, but also to different types of the work tools 104, as well as to a plurality of work tools at the same time.

With continued reference to FIG. 1, depending on the type of work tool 104 being utilized, the machine 102 may be configured to operate in an output mode specific to the type of the work tool 104. An output mode of the machine 102 is specified by appropriate electrical and mechanical parameters for operation of the work tool 104 when attached to the machine component 108. For example, an output mode for a bucket is different from an output mode of a fork in terms of an output power delivered to the work tool 104. If an incorrect output mode is selected, or if no output mode is selected by a manual operator when the work tool 104 is attached to the machine component 108, the machine 102 may not be able to properly perform, or not perform, the job for which the machine 102 was deployed.

Further, depending on the type of the work tool 104, the attachment coupler 106 may be an attachment pin, a latch, a hook, a ball/socket joint, or other types of attachment components that make the work tool 104 able to be coupled to the machine component 108 of the machine 102. In one aspect, the work tool 104 may be stationary. In another aspect, the work tool 104 may be mobile or movable towards the machine 102. For example, another machine (not shown) may be used to push the work tool 104 to match a motion of the machine 102 and/or of the machine component 108. Also, as will be explained in further detail later herein, using an input device such as the controls described earlier herein or a HMI or a GUI, the type of work tool being used may be selected, altering the work tool vision system on where or how to look while monitoring the movement of the work tool relative to the machine.

In some embodiments of the present disclosure, the machine control system 130 may include various hydraulic and electrical power systems controlled by the electronic controller unit 126, based upon output signals from the electronic controller unit 126 to the machine control system 130. The machine control system 130 may include or may be coupled to the steering system 124 configured to guide a motion of the machine 102 and/or the machine component 108. In another aspect, the machine control system 130, or a part thereof, may be located remote from the machine 102, e.g., in a base station physically separated from the machine 102. In this scenario, the machine control system 130 may have a direct or indirect communication link with the electronic controller unit 126 to control the machine 102 for installing the work tool 104. Various operative communication between the machine control system and the steering system may be omitted in other embodiments.

Figure 2:
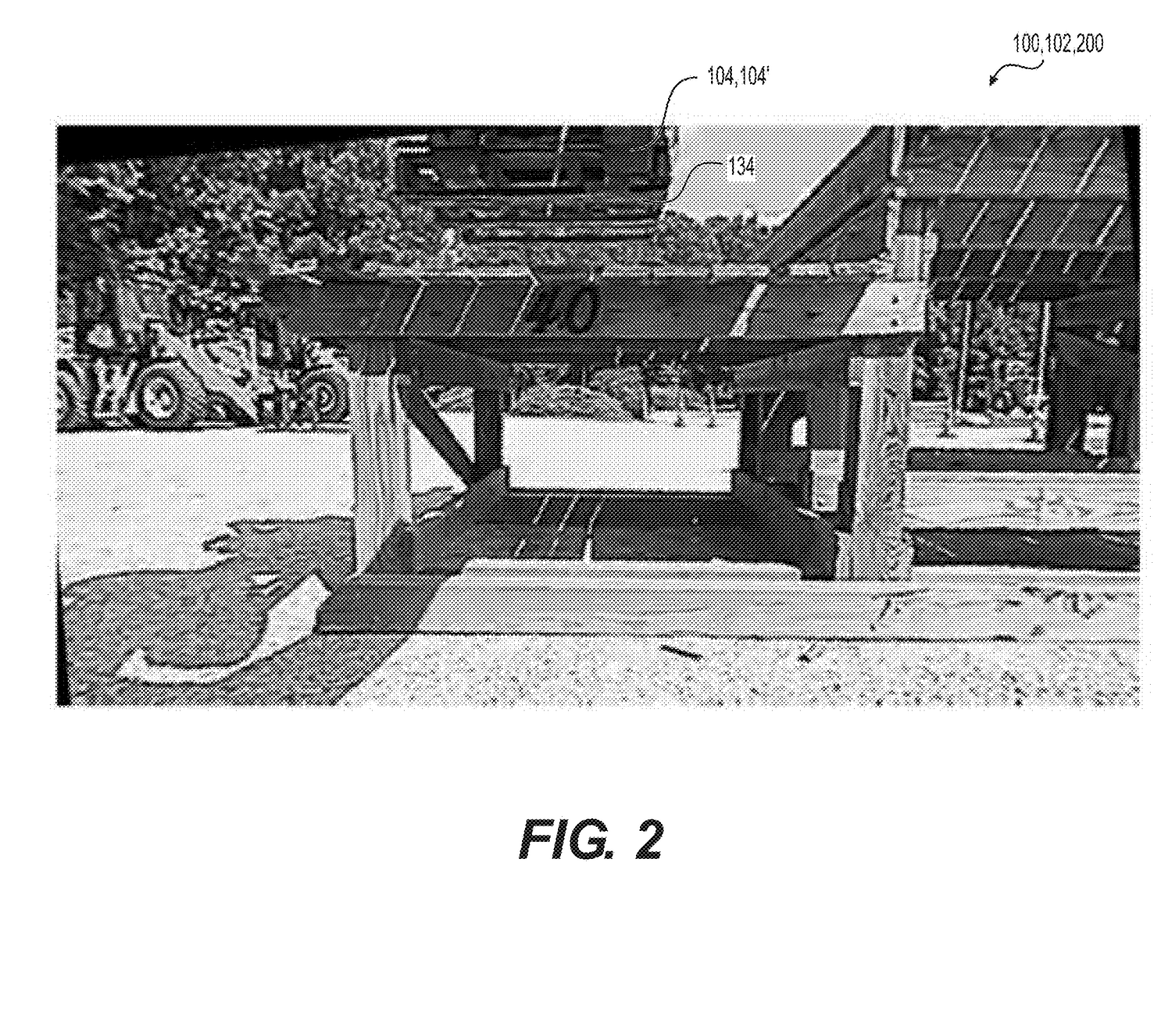
FIG. 2 is a frame of a view of the camera of FIG. 1 showing the work tool in the form a fork lift moving a pallet. The movement of the fork lift slowly brings the fork lift away from the center of the view of camera. Also, zooming up on the center of the frame brings the fork lift closer and closer to the edge of the frame as shown in FIG. 2.
Figure 3:
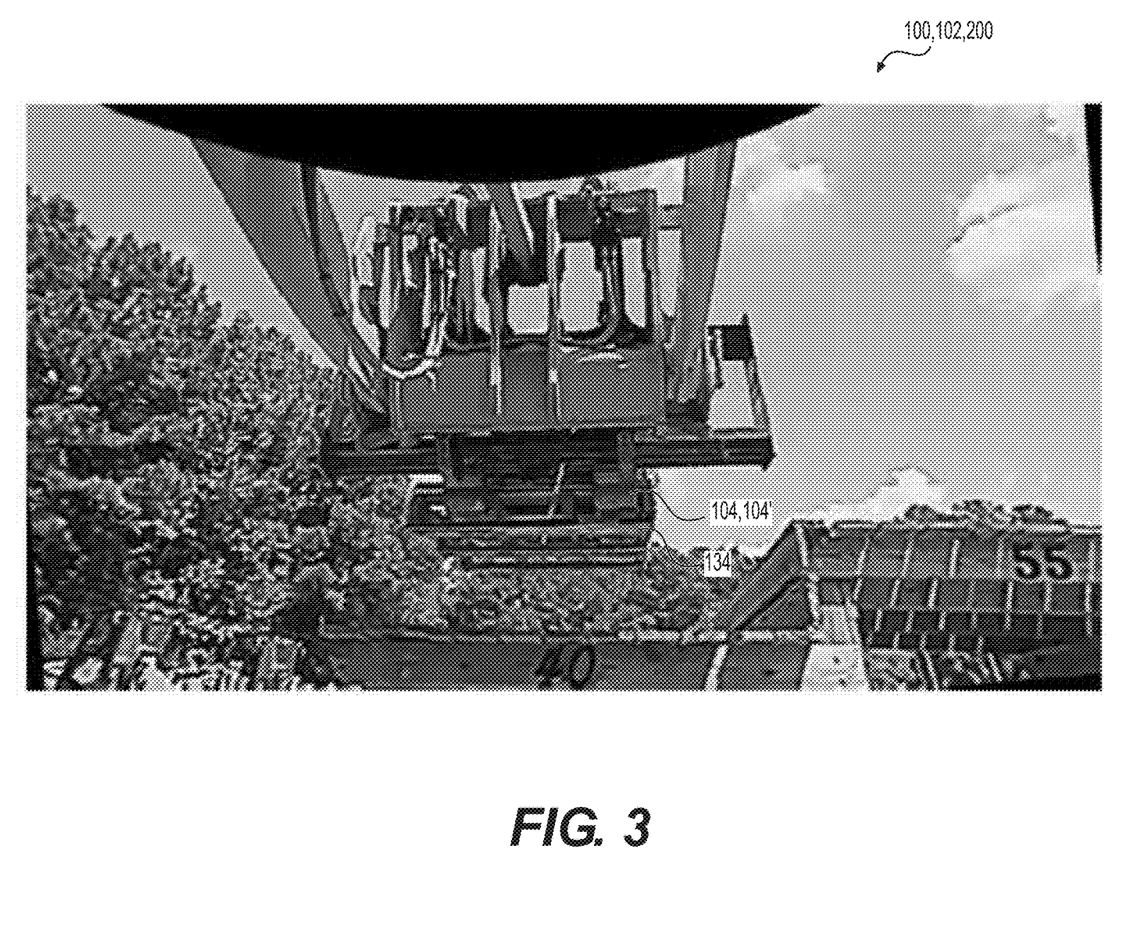
FIG. 3 is a frame of a view of the camera of FIG. 1 that is similar to the frame of FIG. 2 except that the view has been adjusted so that the fork lift is in the center of the view of the camera.

Referring now to FIG. 2, as the work tool 104 in the form of a fork lift 104' moves a pallet 134, the position of the fork lift 104' relative to the machine 102 and the camera changes. As can be seen, the fork lift 104' is now nearly out of the frame of the image provided by the camera to the output device in the cab of the machine or remotely to an operator at a base. This provides little benefit to the operator as objects are moved by the work tool 104 as it is difficult to see how well the work tool is being used. However, as illustrated in FIG. 3, the work tool vision system 200 may compensate for the movement of the fork lift 104' by using an algorithm that tracks the position of the fork lift 104' or other work tool and keeps the work tool centered in the frame of the view of the camera, regardless of where the fork lift 104' or other work tool 104 is relative to the camera.

Figure 4:
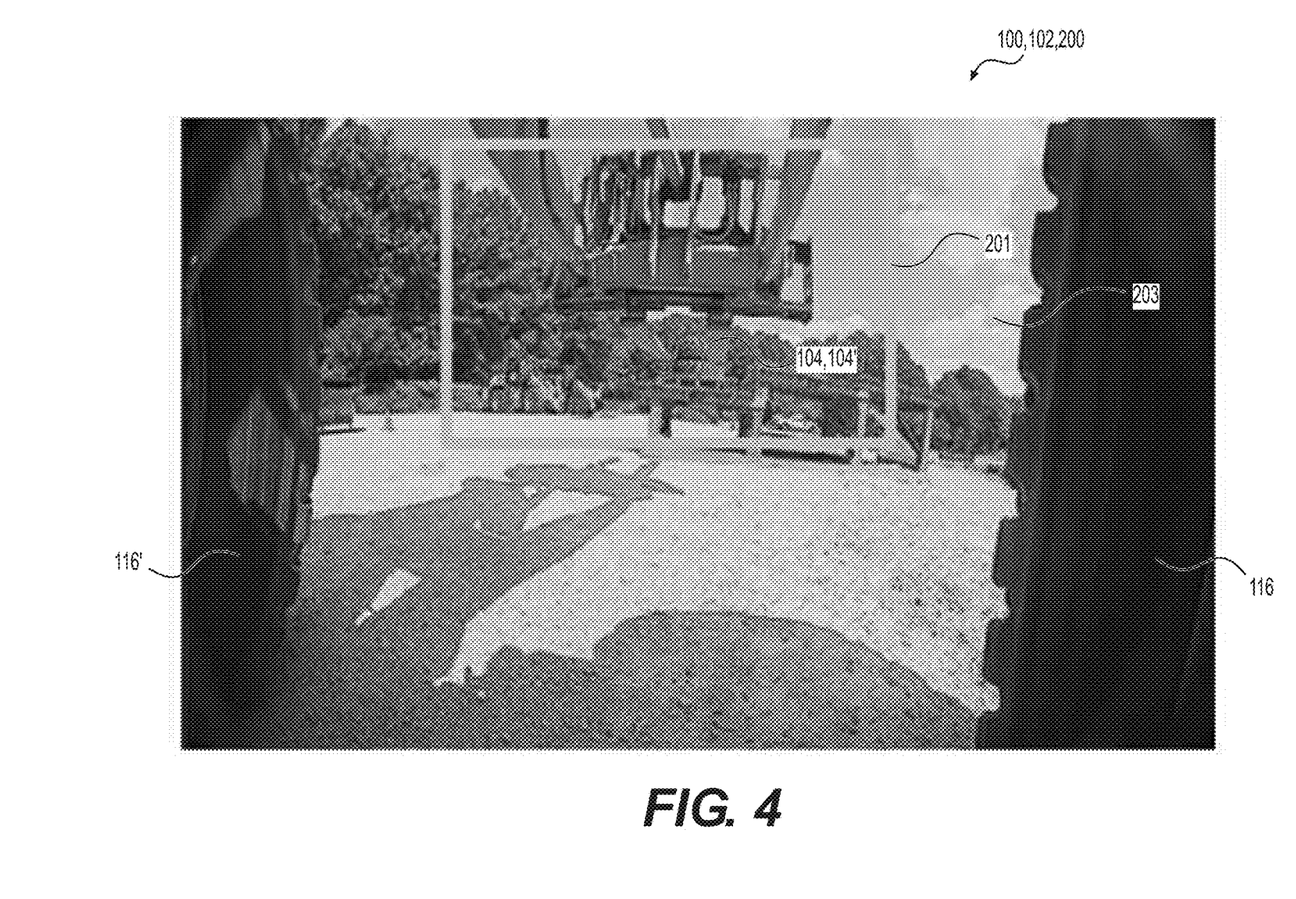
FIG. 4 is a frame of the view of camera of FIG. 1 wherein the vision system applies an algorithm that identifies the work tool (such as forks) and coupler and draws a box around that image.
Figure 5:
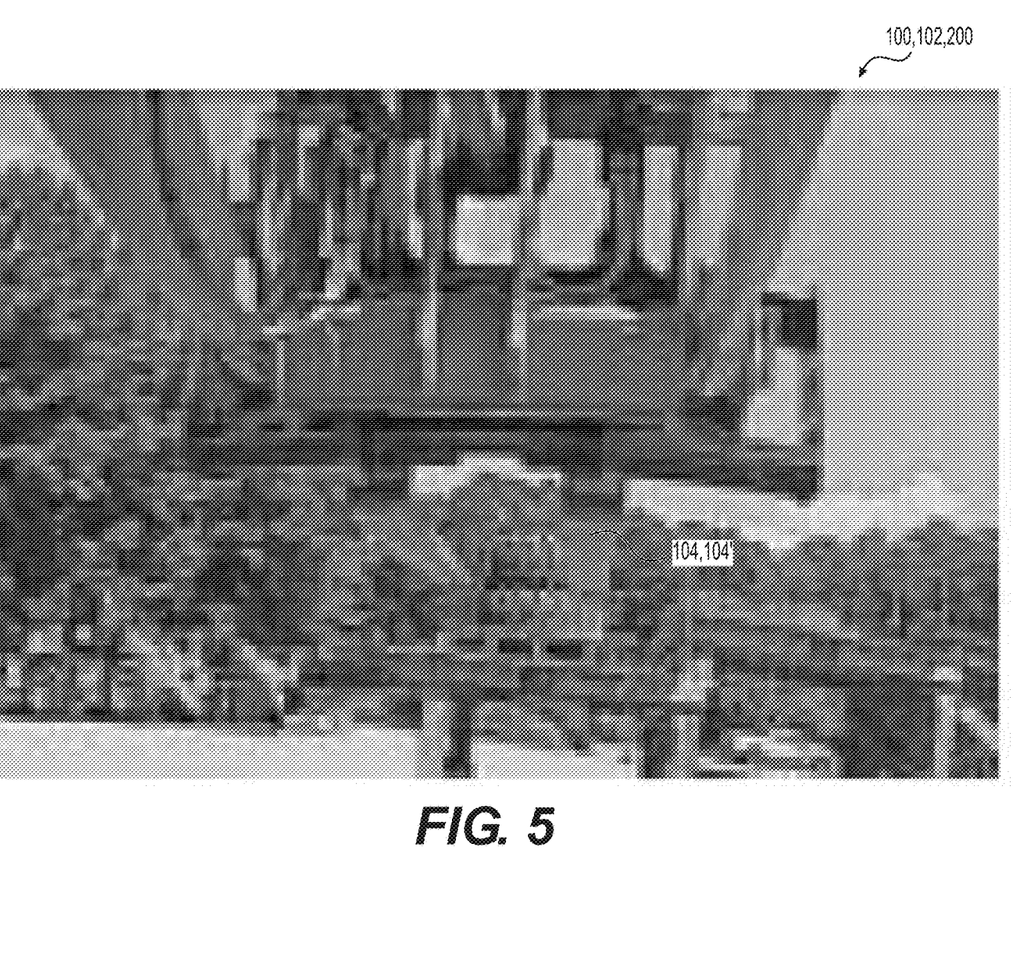
FIG. 5 is a frame of the view of camera of FIG. 1 similar to the frame of FIG. 4 except the rest of the image of FIG. 4 outside of the box has been removed or cropped. The resulting frame of FIG. 5 is slightly distorted.

Beginning with FIGS. 4 and 5, the manner in which an embodiment of the work tool vision system 200 of the present disclosure accomplishes tracking the movement of a work tool 104, keeping it zoomed and centered in the view of the camera or other sensor may be better understood. The algorithm determines a rectangular border 201 or other type of border about the work tool 104 by matching a suitable work tool template or the like to the actual work tool being used. Then, the remaining portion 203 of the image outside the border 201 is cropped and the image is zoomed, yielding the image shown in FIG. 5. At this point, the image may become distorted. Therefore, in some embodiments, the algorithm removes the distortion so that a clearer image is shown to the operator via the output device.

Figure 6:
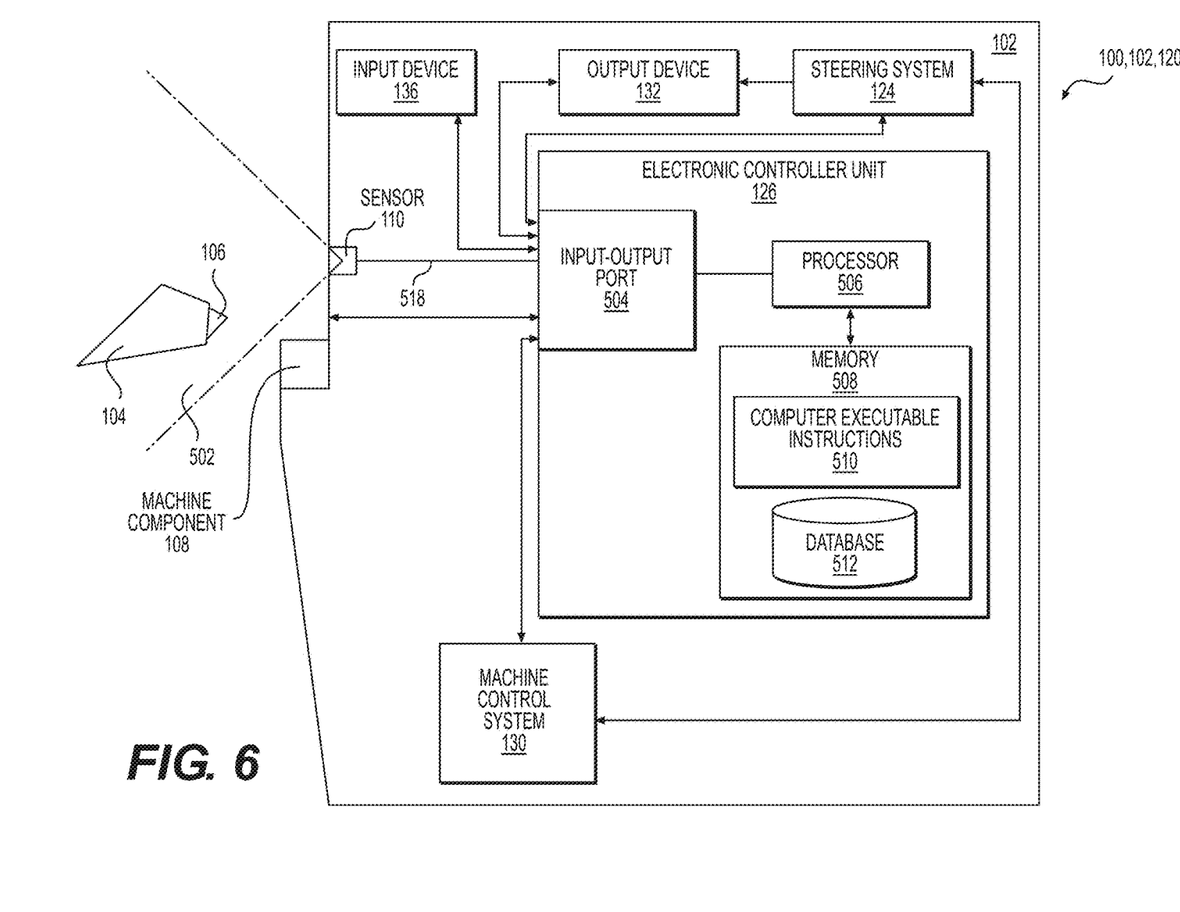
FIG. 6 contains a schematic block diagram of the work tool vision system of the machine of FIG. 1 according to an embodiment of the present disclosure.

Referring to FIG. 6, a schematic diagram of the work tool vision system 200 with the machine 102 including the electronic controller unit 126 is illustrated, in accordance with an embodiment of the present disclosure. The electronic controller unit 126 is coupled to the sensor 110, the machine control system 130, the output device 140, and the steering system 124, as well as to other components of the machine 102 (not shown).

In some instances, the sensor 110 has a field of view 502 within which the work tool 104 and/or the attachment coupler 106 fall. During movement of the work tool 104 and/or the attachment coupler 106, as discussed, the view of the work tool 104 and/or the attachment coupler 106 may be less than optimal (e.g. may be near the edge of the view or too far away to be seen clearly). This may prevent the sensor 110 from obtaining a full image of the work tool 104 and/or the attachment coupler 106 or provide such a view that is helpful to the operator when using the work tool 104. In conventional systems, such changes in the view of the work tool may slow down the use of the work tool or make it difficult to attach the work tool 104 to the machine component 108.

To address this issue, the electronic controller unit 126 may continuously receive an input signal 518 from the sensor 110 at an input-output port 504 of the electronic controller unit 126 and may process that signal 518 to adjust the data or view provided by the sensor 110 so that the work tool 104 and/or coupler 106 are sufficiently clear to the operator.

In some embodiments of the present disclosure, the electronic controller unit 126 includes the input-output port 504, a processor 506, and the memory 508 coupled to each other, for example, by an internal bus (not shown). The electronic controller unit 126 may include additional components known to one of ordinary skill in the art, which components are not explicitly illustrated in FIG. 6. For example, the electronic controller unit 126 may include a programmable logic circuit (PLC), a timer/clocking circuit, heat sinks, visual indicators (e.g., light emitting diodes), impedance matching circuitry, internal buses, co-processors or monitor processors, batteries and power supply units, power controller chips, transceivers, wireless modules, satellite communication processing modules, and embedded systems on various integrated chips. In one embodiment, the electronic controller unit 126 may be separate from an engine controller unit (not shown). In an alternative embodiment, the electronic controller unit 126 may be integrated with or may share space and processing resources with the engine controller unit.

The input-output port 504 may be a single port or a collection of ports. The input-output port 504 is configured to transmit and receive various inputs and data from other parts of the machine 102 and forward such inputs and data to the processor 506. In one aspect, the input-output port 504 may be two separate ports, one configured to receive various input signals from various parts of the machine 102 (e.g., the sensor 110, etc.) and another configured to output signals for display (e.g., on the output device 132) or for control of the machine 102 (e.g., to the machine control system 130). Alternatively, the functionalities of inputting and outputting maybe integrated into a single port illustrated as the input-output port 504 in FIG. 6.

In one aspect, the processor 506 is a hardware device such as an integrated circuit (IC) chip fabricated to implement various features and functionalities of the embodiments discussed herein. By way of example only and not by way of limitation, the processor 506 may be fabricated using a Complementary Metal Oxide Semiconductor (CMOS) fabrication technology. In one embodiment, the processor 506 may be implemented as an Application Specific Integrated Circuit (ASIC), a Field Programmable Gate Array (FPGA), a System-on-a-Chip (SOC), or the like. In another embodiment, the processor 506 may include components such as packaging, input and output pins, heat sinks, signal conditioning circuitry, input devices, output devices, processor memory components, cooling systems, power systems and the like, which are not shown in FIG. 6. In one particular embodiment, the processor 506 is configured to execute various parts of a method 800 illustrated in FIGS. 7 and 8 by executing computer executable instructions 510 in the memory 508. In yet another embodiment, the processor 506 may be a plurality of processors arranged, for example, as a processing array.

The memory 508 may be implemented as a non-transitory computer readable medium. By way of example only, the memory 508 may be a semiconductor based memory device including but not limited to random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. In one embodiment, the memory 508 is coupled to the processor 506 directly via a communication and signal bus. In one embodiment, the memory 508 may be made of or implemented using a non-transitory computer readable storage medium on which the computer executable instructions 510 reside. The computer executable instructions 510 when executed by the processor 506 cause the processor 506 to carry out the features and functionalities of the various aspects of this disclosure, such as those discussed with respect to FIGS. 7 thru 10. Such non-transitory computer readable storage medium may include semiconductor memory, optical memory, magnetic memory, mono- or bistable circuitry (flip-flops, etc.) and the like, or combinations thereof. Such non-transitory computer readable storage medium excludes signals that are transitory.

The computer executable instructions 510 may be executed by the processor 506 using high-level or low-level compilers and programming languages (e.g., C++). In one embodiment, the computer executable instructions 510 may be executed remotely by a base station, and results of such execution provided to the processor 506 for controlling the work tool vision system. In this respect, it will be appreciated that the specific location of the computer executable instructions 510 inside the memory 508 is by way of example only, and not by way of limitation.

In some embodiments, the memory 508 includes or is coupled to a database 512. The database 512 includes images of a plurality of work tools, including the work tool 104. Such images are saved as a library of image files and computerized models in the database 512. Such models or template images may include three-dimensional and two dimensional views of the plurality of work tools attachable to the machine 102, including the work tool 104. Each such image or model in the database 512 may also include an image of the respective attachment couplers of the work tools. For example, an image of the work tool 104 in the database 512 may include an image of the attachment coupler 106. Such image files may be in standard format (e.g., JPEG) known to those of ordinary skill in the art. The database 512 may further include various numerical parameters associated with one or more dimensions of the work tool 104 and the attachment coupler 106, as well as other identification information associated with the work tool 104 and the attachment coupler 106.

In one embodiment, the processor 506 may be able to generate an image of the work tool 104 and the attachment coupler 106 based upon the numerical parameters of the work tool 104 and the attachment coupler 106 stored in the database 512. Such images and information may be continuously accessible to the processor 506 before, during, and after the work tool 104 and/or the attachment coupler 106 has moved in the field of view 502 of the sensor 110.

It will be appreciated that the three-dimensional and two-dimensional views taken by a camera are two visual examples of the machine 102 in operation as outputted on the output device 132, but the output device 132 may continuously display a plurality of three-dimensional scenes on a frame-by-frame basis as provided by the processor 506 to the output device 132 based upon the input signals (including the input signal 518) from the sensor 110 as modified by the processor. In one aspect, the images may be provided on a display of a remote operator of the machine 102 in a remote base station (not shown) as a real-time video of the work scene in which the machine 102 and the work tool 104 are deployed. Such frame-by-frame representation of the work environment of the machine 102 when used for recognition and monitoring of the movement of the work tool 104 may be in a simulation format, or may be used as a simulation to train operators of the machine 102 to install the work tool 104. In other applications, the output device 132 may be located in the cab 112 of the machine 102 as shown in FIG. 1 where the operator may see how the work tool 104 is moving or otherwise manipulating an object, work material, etc.

INDUSTRIAL APPLICABILITY

In practice, a work tool vision system, an electronic controller unit or method according to any embodiment described, shown or discussed herein may be sold, bought, manufactured, remanufactured, retrofitted, assembled or otherwise obtained in an aftermarket or OEM context. Similarly, a machine using such a work tool vision system, an electronic controller unit or a method according to any embodiment described herein may be provided when the machine is new or when the machine is retrofitted with any of these embodiments.

Referring back to FIG. 6 while also looking at FIG. 9, a work tool vision system 200 for monitoring the movement of a work tool 104 may be provided as follows. The work tool vision system 200 may comprise a sensor 110, and an electronic controller unit 126 coupled to the sensor 110, wherein the electronic controller unit 126 is configured to sense the position of the work tool at a first time interval (see block 600 in FIG. 9), and sense the position of the work tool at a second time interval (see block 602), and zoom and center on a portion of the sensed data of the work tool taken at the second time interval if the position of the work tool relative to the sensor has changed from the first time interval to the second time interval (see block 604).

In many embodiments, the electronic controller unit may be further configured to store a data template of the work tool (see block 606). In such embodiments, wherein electronic controller unit is further configured to match the data template of the work tool to sensed data of the work tool (see block 608). In particular embodiments, the electronic controller unit is further configured to store a database of data templates for various work tools and to compare the sensed data of the work tool to one or more data templates (see block 610).

In many embodiments, the sensor 110 is a camera with a wide field of view 502 and the sensed data are images of the work tool 104 taken by the camera (see FIG. 6).

Figure 9:
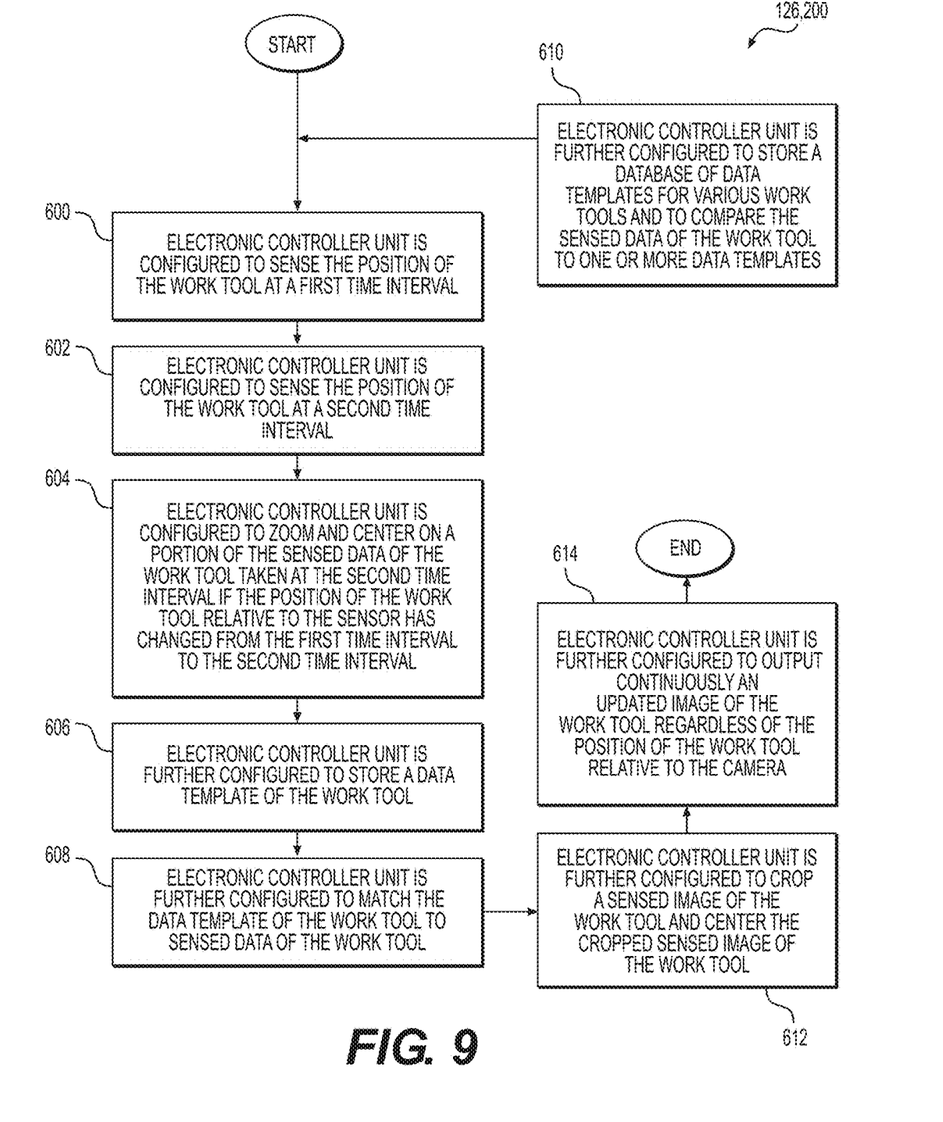
FIG. 9 contains a schematic block diagram illustrating how the electronic controller unit of the work tool vision system of FIG. 6 may be configured.

In some embodiments, the electronic controller unit is further configured to crop a sensed image of the work tool and center the cropped sensed image of the work tool (see block 612 in FIG. 9). The work tool vision system 200 may further comprise an output device 132 that is in communication with the electronic controller unit 126 (see FIG. 6) and the electronic controller unit 126 may be further configured to send a signal to the output device 132 that displays an image of the work tool 104.

In many embodiments, the electronic controller unit is further configured to output continuously an updated image of the work tool regardless of the position of the work tool relative to the camera (see block 614 in FIG. 9).

The work tool vision system 200 may in some embodiment further comprise an input device 136 that is communication with the electronic controller unit 126 and the input device may be configured to send a signal to the electronic controller unit to affect the functioning of the work tool vision system 200.

Figure 10:
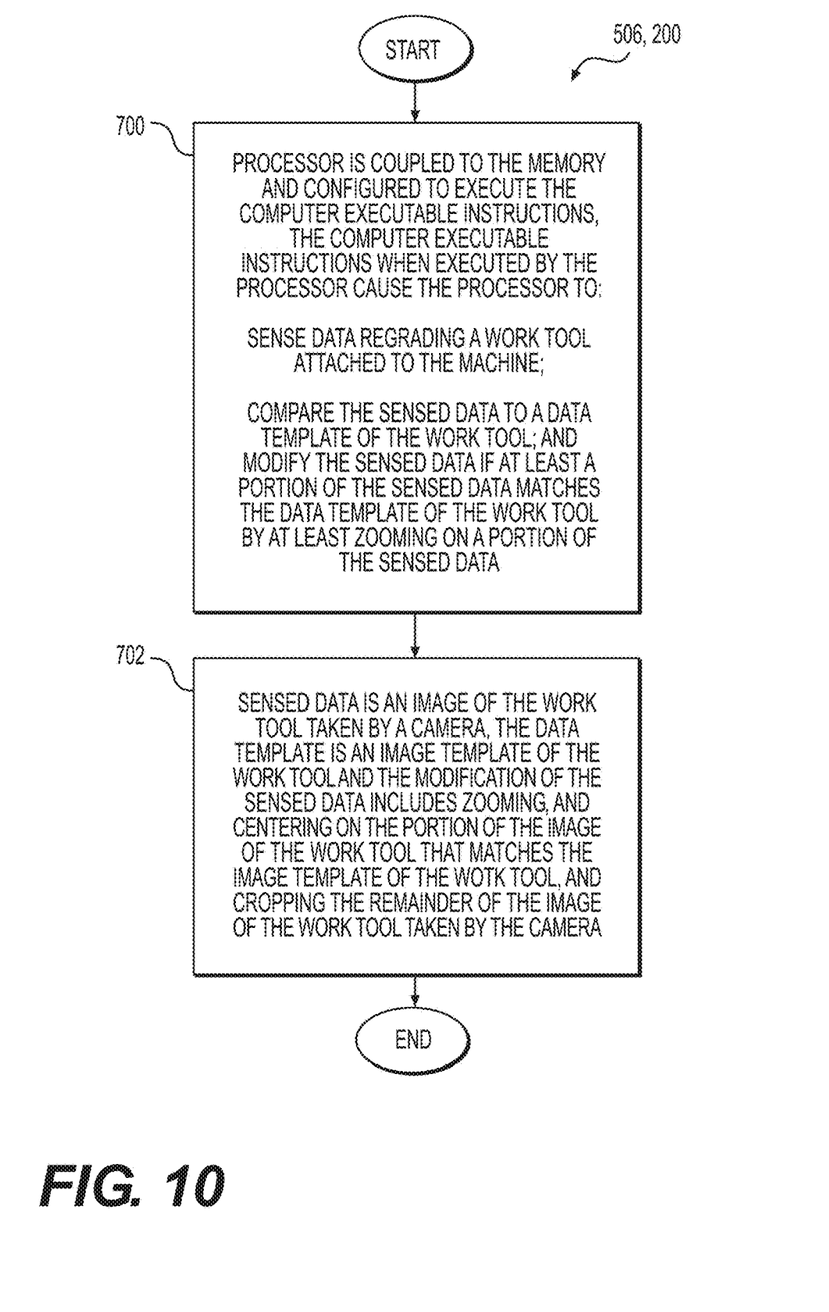
FIG. 10 contains a schematic block diagram depicting how a processor executes a set of computer executable instructions that may be used by the work tool vision system of FIG. 6.

In certain embodiments, as understood looking at FIG. 6 and FIG. 10, an electronic controller unit 126 of a machine may comprise a memory 508 including computer executable instructions 510 for recognizing a work tool 104, and a processor 506 coupled to the memory 508 and configured to execute the computer executable instructions 510, and the computer executable instructions 510 when executed by the processor 506 cause the processor 506 to: sense data regarding a work tool attached to the machine, compare the sensed data to a data template of the work tool, and modify the sensed data if at least a portion of the sensed data matches the data template of the work tool by at least zooming on a portion of the sensed data (see block 700 in FIG. 10). In many instances, the sensed data is an image of the work tool taken by a camera, the data template is an image template of the work tool and the modification of the sensed data includes zooming, and centering on the portion of the image of the work tool that matches the image template of the work tool, and cropping the remainder of the image of the work tool taken by the camera (see block 702).

Figure 7:
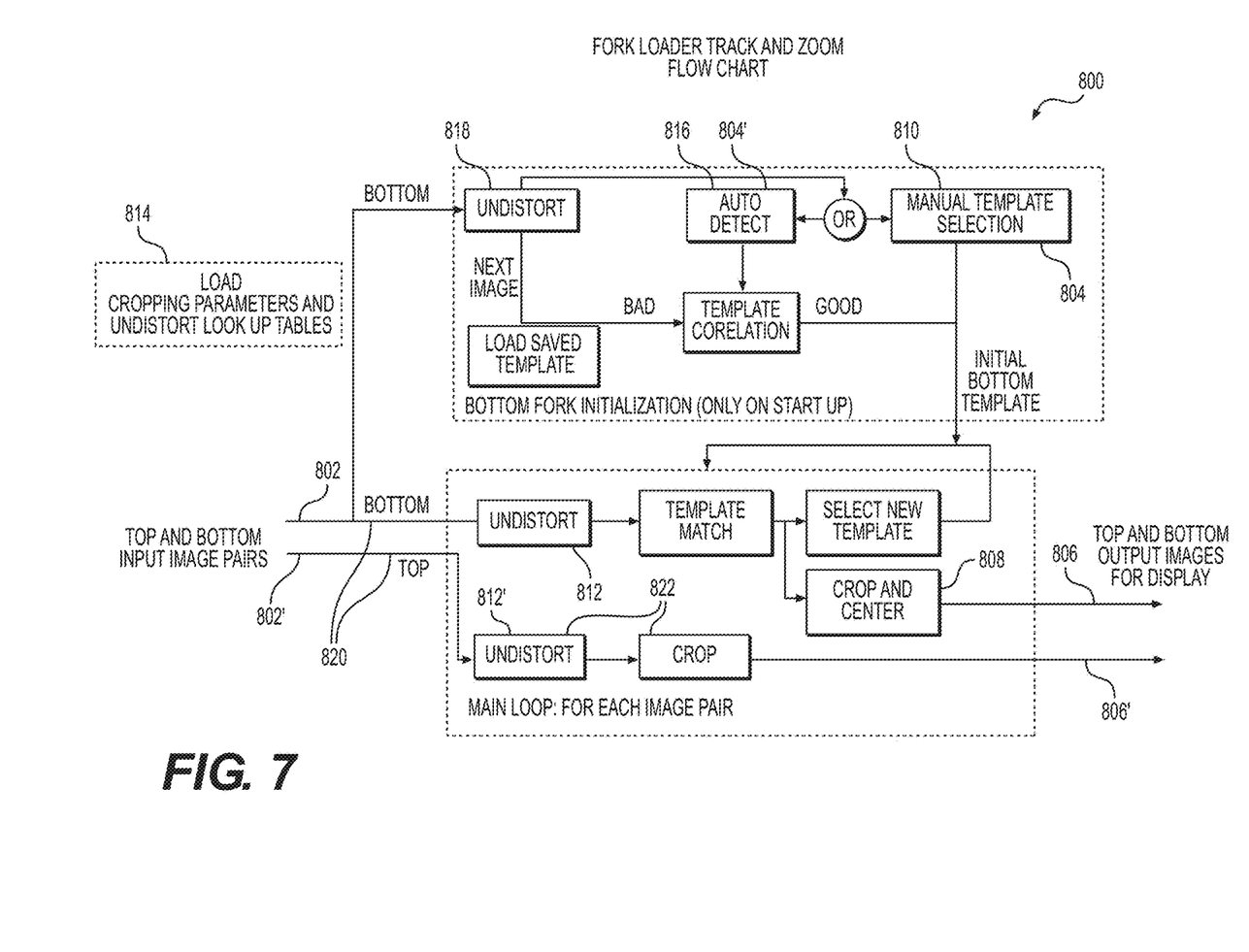
FIGS. 7 and 8 are flow charts describing a start-up algorithm for loading template images and a main algorithm for centering, cropping and undistorting the view of the camera about the work tool.
Figure 8:
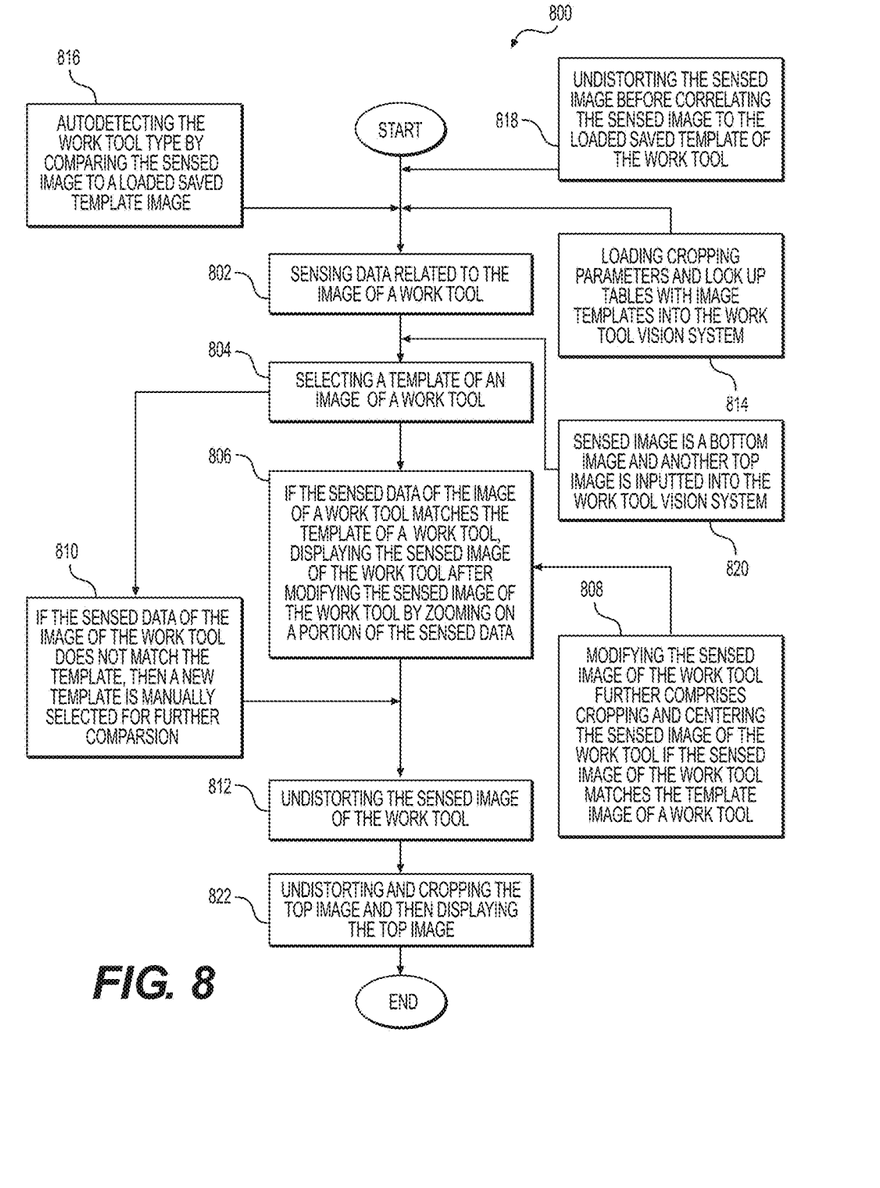

Focusing now on FIGS. 7 and 8, the method 800 for a work tool vision system used to monitor the movement of a work tool of a machine according to an embodiment of the present disclosure may be described as follows. The method 800 may comprise sensing data related to the image of a work tool (step 802), selecting a template of an image of a work tool (step 804), and if the sensed data of the image of a work tool matches the template of an image of a work tool, displaying the sensed image of the work tool after modifying the sensed image of the work tool (step 806).

In some embodiments, modifying the sensed image of the work tool further comprises cropping and centering the sensed image of the work tool if the sensed image of the work tool matches the template image of a work tool (step 808).

In other embodiments, if the sensed data of the image of the work tool does not match the template, then a new template is manually selected for further comparison (step 810). In some cases, the method further comprises undistorting the sensed image of the work tool (step 812).

In certain embodiments, the method further comprises loading cropping parameters and look up tables with image templates into the work tool vision system (step 814).

In yet further embodiments, the method further comprises auto-detecting the work tool type by comparing the sensed image to a loaded saved template image (step 816). In some cases, the method further comprises undistorting the sensed image before correlating the sensed image to the loaded saved template of the work tool (step 818).

In some embodiments, the sensed image is a bottom image and another top image is inputted into the work tool vision system (step 820). In such a case, the method may further comprise undistorting and cropping the top image and then displaying the top image (step 822).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for monitoring the movement of a work tool of a machine using a work tool vision system, the method comprising:
   sensing data related to the image of a work tool;
   selecting a template of an image of a work tool; and
   if the sensed data of the image of a work tool matches the template of an image of a work tool, displaying the sensed image of the work tool after modifying the sensed image of the work tool by at least zooming and centering automatically on a portion of the sensed data of the image.

2. The method of claim 1, wherein modifying the sensed image of the work tool further comprises cropping and centering the sensed image of the work tool if the sensed image of the work tool matches the template image of a work tool.

3. The method of claim 2, wherein if the sensed data of the image of the work tool does not match the template, then a new template is manually selected for further comparison.

4. The method of claim 2, further comprising undistorting the sensed image of the work tool.

5. The method of claim 1, further comprising loading cropping parameters and look up tables with image templates into the work tool vision system.

6. The method of claim 5, further comprising auto-detecting the work tool type by comparing the sensed image to a loaded saved template image.

7. The method of claim 6, further comprising undistorting the sensed image before correlating the sensed image to the loaded saved template of the work tool.

8. The method of claim 1 wherein the sensed image is a bottom image and another top image is inputted into the work tool vision system.

9. The method of claim 8 further comprising undistorting and cropping the top image and then displaying the top image.

10. A work tool vision system for monitoring the movement of a work tool, the system comprising:
a sensor; and
an electronic controller unit coupled to the sensor, wherein the electronic controller unit is configured to:
sense the position of the work tool at a first time interval;
sense the position of the work tool at a second time interval; and
zoom and center automatically on a portion of the sensed data of the work tool taken at the second time interval if the position of the work tool relative to the sensor has changed from the first time interval to the second time interval.

11. The work tool vision system of claim 10, wherein the electronic controller unit is further configured to store a data template of the work tool.

12. The work tool vision system of claim 11, wherein the electronic controller unit is further configured to match the data template of the work tool to sensed data of the work tool.

13. The work tool vision system of claim 12, wherein the sensor is a camera with a wide field of view and the sensed data are images of the work tool taken by the camera.

14. The work tool vision system of claim 13, wherein the electronic controller unit is further configured to crop a sensed image of the work tool and center the cropped sensed image of the work tool.

15. The work tool vision system of claim 14 further comprising an output device that is in communication with the electronic controller unit and the electronic controller unit is further configured to send a signal to the output device that displays an image of the work tool.

16. The work tool vision system of claim 12, wherein the electronic controller unit is further configured to store a database of data templates for various work tools and to compare the sensed data of the work tool to one or more data templates.

17. The work tool vision system of claim 15 wherein the electronic controller unit is further configured to output continuously an updated image of the work tool regardless of the position of the work tool relative to the camera.

18. The work tool vision system of claim 10 further comprising an input device that is communication with the electronic controller unit and the input device is configured to send a signal to the electronic controller unit to affect the functioning of the work tool vision system.

19. An electronic controller unit of a machine comprising:
a memory including computer executable instructions for recognizing a work tool; and
a processor coupled to the memory and configured to execute the computer executable instructions, the computer executable instructions when executed by the processor cause the processor to:
sense data regarding a work tool attached to the machine;
compare the sensed data to a data template of the work tool; and
modify the sensed data if at least a portion of the sensed data matches the data template of the work tool by at least zooming and centering automatically on a portion of the sensed data.

20. The electronic controller unit of claim 19 wherein the sensed data is an image of the work tool taken by a camera, the data template is an image template of the work tool and the modification of the sensed data includes zooming, and centering on the portion of the image of the work tool that matches the image template of the work tool, and cropping the remainder of the image of the work tool taken by the camera.

* * * * *